(12) United States Patent
Deldalle et al.

(10) Patent No.: US 9,777,644 B2
(45) Date of Patent: Oct. 3, 2017

(54) FUEL METER PROTECTED FROM ICING

(71) Applicant: SNECMA, Paris (FR)

(72) Inventors: Regis Michel Paul Deldalle, Servon (FR); Anne Marie Cecile Barreau, Lieusaint (FR); Jean-Marie Brocard, Champigny en Beauce (FR); Pierre Charles Mouton, Grigny (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/825,566

(22) Filed: Aug. 13, 2015

(65) Prior Publication Data

US 2017/0044993 A1    Feb. 16, 2017

(51) Int. Cl.
*G05D 11/00*  (2006.01)
*F02C 9/26*  (2006.01)
*F02M 51/06*  (2006.01)

(52) U.S. Cl.
CPC ......... *F02C 9/263* (2013.01); *F02M 51/0653* (2013.01)

(58) Field of Classification Search
CPC ............................... F02C 9/263; F02M 69/18
USPC ... 137/115.03, 115.1, 115.08, 115.09, 625.3, 137/625.35, 625.38; 251/205, 206; 60/39.093, 734, 736
See application file for complete search history.

(56) References Cited

U.S. PATENT DOCUMENTS

| | | | | |
|---|---|---|---|---|
| 3,465,778 A | * | 9/1969 | Kast | F02C 9/263 137/115.1 |
| 4,226,365 A | * | 10/1980 | Norris | F02C 9/263 137/118.01 |
| 5,772,182 A | * | 6/1998 | Stambaugh, Sr. | F02C 7/232 137/557 |
| 5,941,074 A | * | 8/1999 | Schultz | F02C 7/228 137/118.02 |
| 6,782,692 B2 | * | 8/2004 | Hodinot | F02C 7/232 137/625.48 |
| 8,511,329 B1 | * | 8/2013 | Rickis | F02C 7/232 137/15.21 |
| 2002/0174647 A1 | | 11/2002 | Hodinot et al. | |

FOREIGN PATENT DOCUMENTS

FR    2 825 120 A1    11/2002

* cited by examiner

*Primary Examiner* — Reinaldo Sanchez-Medina
(74) *Attorney, Agent, or Firm* — Oblon, McClelland, Maier & Neustadt, L.L.P.

(57) ABSTRACT

A fuel metering unit including a movable element including at least one fuel passage section opening upstream towards a fuel supply conduit and opening downstream towards a conduit of use through a metering slot with a flared profile having a narrow passage section flaring as far as a wide passage section, the movable element being able to be moved with respect to a fixed element between a low flow rate position in which the metering slot is for a large part obstructed and a high flow rate position in which the metering slot is for a large part exposed, the metering slot being made in the fixed element or in the movable element and its obstruction being obtained by covering the slot with a wall of the movable element or of the fixed element.

12 Claims, 6 Drawing Sheets

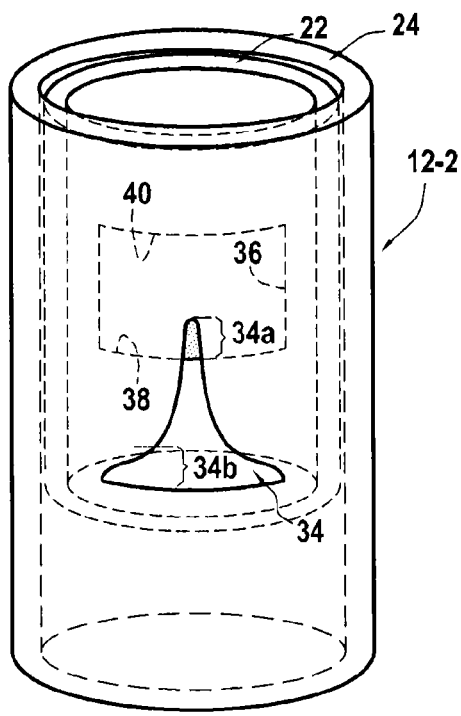
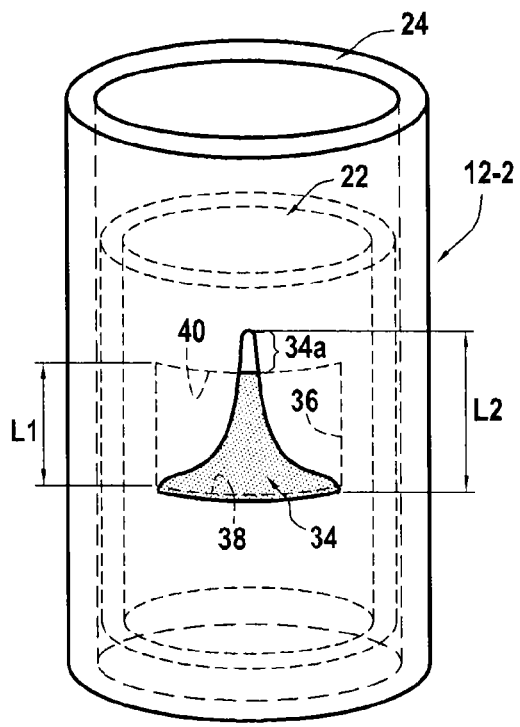
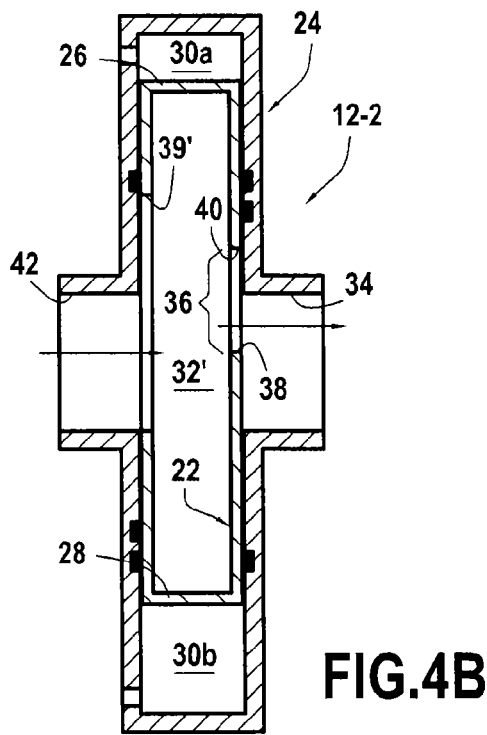
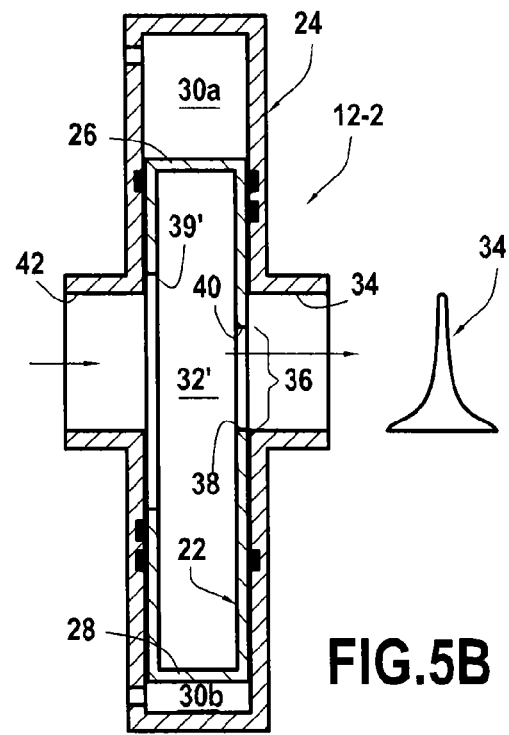

FUEL METER PROTECTED FROM ICING

BACKGROUND OF THE INVENTION

The present invention relates to the general field of fuel metering units with variable geometrical aperture. It finds a preferential application to fuel metering units fitting out fuel supply circuits of an aircraft engine, and more particularly to circuits delivering fuel for feeding combustion injectors of the engine.

Generally, a fuel supply circuit of an aircraft engine comprises a pumping system consisting of a low pressure pump connected upstream to the fuel tank of the aircraft and associated downstream with a high pressure pump which is driven by the engine via an accessories gear box (or AGB). Downstream from the high pressure pump, the fuel supply circuit is separated into two branches, one of the branches comprising a bypass control valve and a fuel metering unit allowing regulation of the fuel flow rate feeding the combustion injectors of the engine, and the other branch comprising a heat exchanger and sending the fuel towards actuators of variable geometries of the engine (for example, air discharge valves or control valves for vanes of variable pitch). The excess fuel flow rate generated by the high pressure pump is returned to the inlet of this pump through the bypass control valve, which partially contributes to heating up the circuit, particularly at low flow rates of the engine where the recycling rate is maximal.

Such a fuel supply circuit should be protected against the risk of icing of the water contained in the fuel. Indeed, the pressure and the temperature encountered during flight may cause water to pass from the liquid state to the solid state and cause malfunctions of the fuel supply circuit.

In conventional architectures of fuel supply circuits, the units which are the most sensitive to icing are supplied with heated fuel at a positive temperature for a heat exchanger. However, when the oil is used for heating the fuel, the heat power available in the oil system of the engine only gives the possibility of sufficiently heating, from a dedicated oil/fuel exchanger, the fuel for the low flows sent towards the actuators of variable geometries of the engine. Indeed, this heat power is not sufficient for heating the fuel for the large flows crossing the fuel meter, for example during the take-off and ascent phases of the aircraft. Now, the units which are the bypass control valve, the fuel meter and the combustion injectors of the engine may be sensitive to icing of the fuel.

In order to make the bypass control valve less sensitive to icing of the fuel, resorting to a server-controlled valve with a large force margin and with a heated pressure difference detector at the terminals of the valve is known. As for the combustion injectors, they may generally operate for a significant time under icing conditions before leading to malfunction of the engine. This time is generally longer than the time of the mission portion where the fuel is found under icing conditions.

On the other hand, the fuel metering unit is a unit which is made insensitive to icing of the fuel only with difficulty, in particular when this is a fuel meter provided with a metering slot with an exponential passage profile. Such a metering unit has the advantage of giving the possibility of obtaining high accuracy in the metering of fuel at low flow rates. However, when it is supplied with fuel under icing conditions, the small width portion of the metering slot tends to be partly blocked because of ice particles which will agglomerate therein. More specifically, this partial blocking typically appears for high flow rates (for which the fuel is at a negative temperature) in the narrow portion of the slot. The result of this is that in the case of returning to low flow rates after operating with a high flow rate (typically in the case of returning to an idling phase of the engine), there exists a non-negligible risk that the injected fuel flow rate becomes less than the limit set by the extinction abutment, and therefore there is a risk of extinction of the combustion chamber of the engine.

The published patent application FR 2825120 A1 discloses a fuel metering unit provided with a metering slot with an exponential passage profile, the metering unit being of cylindrical geometry with a movable element as a piston. The metering slot is split into two portions spaced apart from each other circumferentially and separated by sealing means, so as to produce an outlet for low flow rates separated from the outlet for high flow rates. The outlet dedicated to low flow rates corresponds to the narrow portion of the slot, while the outlet dedicated to high flow rates corresponds to the widest portion of the slot. Such a device is particularly suitable for limiting over-speed by only obturating the outlet dedicated to high flow rates.

However, this known device does not give the possibility, when it is supplied with fuel under icing conditions, of preventing the output dedicated to low flow rates, i.e. the small width portion of the slot, of being partly blocked because of ice particles which will agglomerate therein.

OBJECT AND SUMMARY OF THE INVENTION

The present invention is therefore mainly directed to overcoming such drawbacks by proposing a fuel meter which is tolerant to the icing of fuel.

This object is achieved by means of a fuel metering unit comprising a movable element including at least one fuel passage section opening upstream towards a fuel supply conduit and opening downstream towards a conduit for use through a metering slot with a flared profile having a narrow passage section flaring as far as a wide passage section, the movable element being able to be moved relatively to a fixed element between a low flow rate position in which the metering slot is for a large part obstructed and a high flow rate position in which the metering slot is for a great part exposed, the metering slot being made in the fixed element or in the movable element and its obstruction being obtained by covering the slot with a wall of the movable element or of the fixed element. According to the invention, the metering unit further includes means for obstructing at least partly the narrow passage section of the metering slot when the meter is in a high flow rate position.

At a low flow rate, the fuel is typically at a positive temperature, so that the risk of blocking the metering slot of the metering unit (by agglomeration of ice particles) is inexistent. At a high flow rate, the fuel is on the contrary at a negative temperature, which causes the formation of ice particles in the fuel. In this high flow rate position, the metering slot of the meter according to the invention is obstructed in its narrowest passage section, which gives the possibility of avoiding agglomeration of ice particles therein (the remainder of the metering slot being wider, the ice particles do not have the capability of agglomerating therein). When the fuel flow of the metering unit returns from this high flow rate position to its low flow rate position, the narrowest portion of the metering slot which becomes the only passage section for the fuel is therefore not obstructed, while the oil fuel thermal balance gives the possibility of leaving the icing conditions, which gives the possibility of avoiding any risk of extinction of the combustion chamber of the engine.

Any risk of blocking the metering slot of the fuel metering unit according to the invention may be avoided without however affecting the operation of the fuel meter. In other words, the invention gives the possibility of avoiding blocking of the narrow passage section of the metering slot which occurs at a high flow rate and of finding again at a low flow rate a correlation between the flow rate and the position of the metering unit which is not affected by the icing.

According to a first embodiment, the metering slot is made in the fixed element and opens into the fuel passage section via a lumen made in the movable element and longitudinally delimited between a main edge and a secondary edge, said lumen having a shorter length than a length of the metering slot and being able to move facing the latter so as to at least partly obstruct the narrow passage section of the metering slot when the meter is in the high flow rate position.

In this first embodiment, the fixed element may form a bushing which comprises a window opening upstream towards the fuel supply conduit and opening into the fuel passage section, said window being longitudinally shifted with respect to the metering slot.

In this case, advantageously, the movable element forms a drawer able to longitudinally slide in the bushing, and the secondary edge is formed by a shoulder protruding into the fuel passage section between two spans of the drawer. This shoulder may be an element added on the drawer (which makes the invention easily adaptable to existing fuel meters).

According to a second embodiment, the fixed element comprises a window opening upstream towards the fuel supply conduit and opening into the fuel passage section, said window being alternatively longitudinally aligned with the metering slot.

According to a third embodiment, the fixed element further comprises an orifice opening into the fuel passage section and opening towards a conduit of use, said orifice being obstructed by the secondary edge of the lumen of the movable element when the latter is in a high flow rate position and exposed when it is in the low flow rate position.

In this case, the secondary edge of the lumen of the movable element may advantageously have a profiled profile so as to allow obstruction of the orifice as soon as the narrow passage section of the metering slot begins to be obstructed. Further, in an alternative embodiment, the fixed element may further comprise an orifice opening towards a conduit of use, and the movable element may comprise an additional lumen through which the fuel passage section opens towards the conduit of use, said additional lumen being able to be moved facing said orifice so as to be able to obstruct it when the metering unit is in the high flow rate position.

According to a fourth embodiment, the metering slot is made in the movable element facing the fuel passage section and opens towards the conduit of use via a lumen made in the fixed element and longitudinally delimited between a main edge and a secondary edge, said lumen of the fixed element having a shorter length than a length of the metering slot and the metering slot being able to move facing the lumen so that at least one portion of the narrow passage section of the metering slot is obstructed when the metering unit is in the high flow rate position.

In this fourth embodiment, the fixed element may comprise a window opening upstream towards the fuel supply conduit and opening into the fuel passage section, said window being longitudinally shifted with respect to the lumen.

The movable element may include at least two spans and said at least one fuel passage section is located between said spans.

The object of the invention is also a fuel supply circuit of an aircraft engine, including a low pressure pumping system connected to a high pressure pumping system and a fuel metering unit as defined earlier for which the fuel passage section opens in the downstream direction towards combustion chamber injectors of the engine.

SHORT DESCRIPTION OF THE DRAWINGS

Other features and advantages of the present invention will become apparent from the description made below, with reference to the appended drawings which illustrate exemplary embodiments thereof, without any limitation. In the Figures:

FIGS. 4A-4B and 5A-5B represent a fuel metering unit according to a second embodiment of the invention in its low flow rate and high flow rate position, respectively;

DETAILED DESCRIPTION OF THE INVENTION

A fuel metering unit according to the invention is described hereafter within the scope of an application to a fuel supply circuit of an airplane gas turbine engine. However, the field of application of the invention extends to fuel supply circuits of other aircraft, notably helicopters and to aircraft engines other than a gas turbine.

Figure 1:
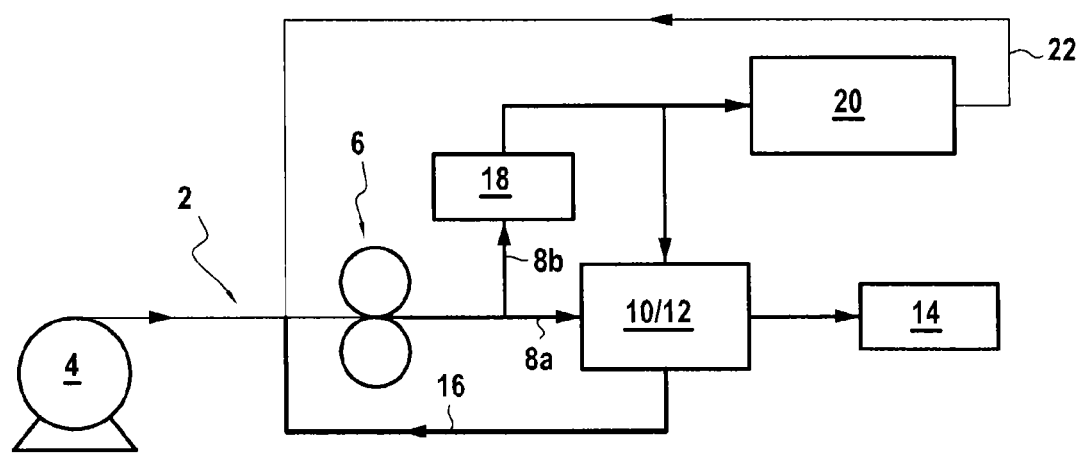
FIG. 1 is a schematic view of a fuel supply circuit of an aircraft engine to which the invention is applied.
Figure 2A:
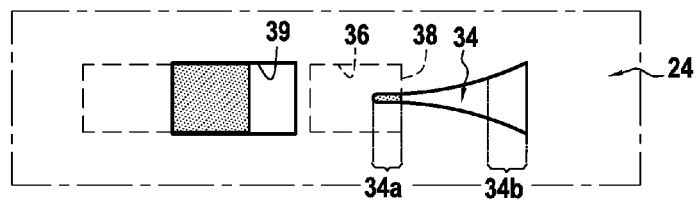
FIGS. 2A-2B and 3A-3B illustrate schematically a fuel metering unit according to a first embodiment of the invention in its low flow rate position and high flow rate position respectively.
Figure 2B:
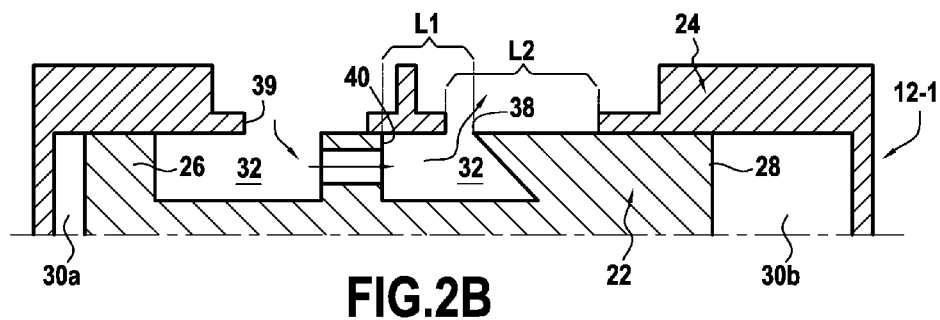
Figure 3A:
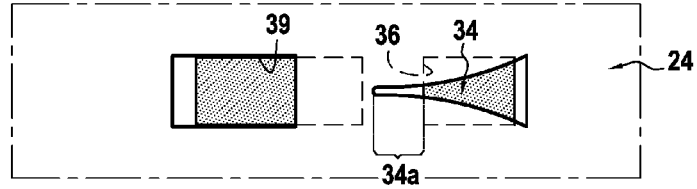
Figure 3B:
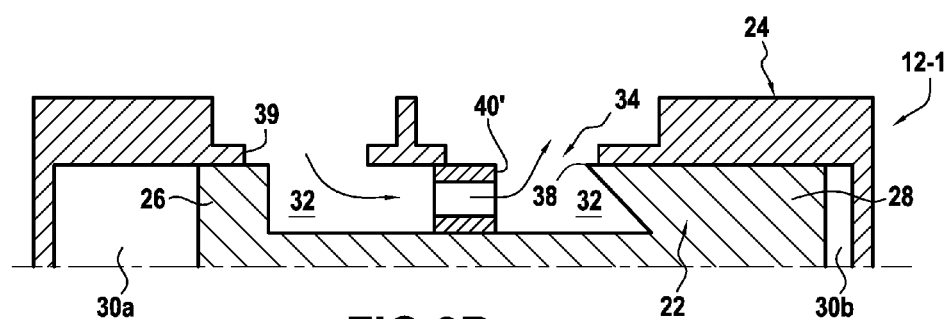
Figure 6:
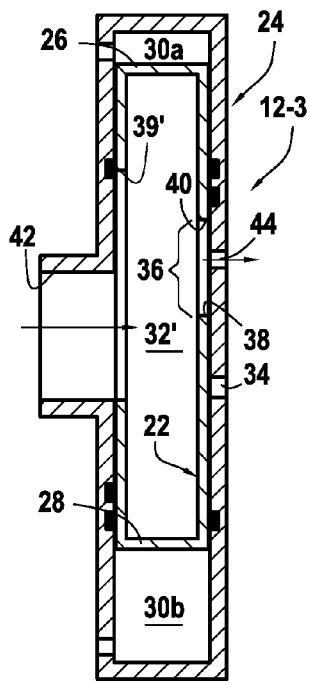
FIGS. 6, 7A-7B, 8A-8B and 9A-9B-9C illustrate a fuel metering unit according to a third embodiment of the invention in different positions.
Figure 7B:
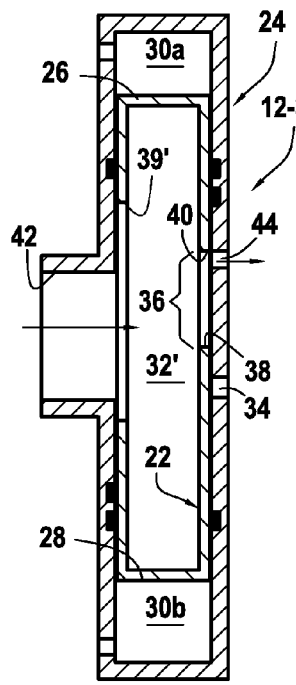

The fuel supply circuit 2 illustrated in FIG. 1 typically includes a low pressure pumping system 4 connected upstream to a fuel tank (not shown) of the aircraft and associated downstream with a high pressure pump 6 which is generally driven by the engine via an accessories gear box (or AGB, not shown in FIG. 1).

Downstream from the high pressure pump 6, the fuel supply circuit 2 is separated into two branches 8a, 8b. One of the branches 8a comprises a bypass control valve 10 and a fuel metering unit 12 giving the possibility of regulating the fuel flow feeding the combustion injectors 14 of the engine, and sending the excess fuel into the circuit upstream from the high pressure pump 6, via a recycling loop 16.

The other branch 8b comprises a heat exchanger 18 and sends the fuel towards actuators with variable geometries 20 of the engine (for example air discharge valves or vanes with variable pitch angle). The fuel used is sent back upstream from the high pressure pump 6, via another recycling loop 22.

The fixed and movable elements of the metering unit, object of this invention, may assume different shapes, such as furrings, drawers, pipe elements, plates in rotation or in translation, etc. In order to explain the design of the invention, for which the application is not limited to this sole shape, the meter which will be described hereafter, will comprise a drawer as a movable element and a bushing as a fixed element.

FIGS. 2A-2B and 3A-3B schematically illustrate a fuel metering unit 12-1 according to a first embodiment of the invention which may be used for the fuel supply circuit 2 described earlier.

In a way known per se, the fuel metering unit 12-1 comprises a drawer 22 which may slide inside a bushing 24, for example a cylindrical bushing. The drawer 22 comprises two spans 26, 28 which may divide the internal volume of the bushing 24 into two control chambers 30a, 30b which are located at both ends of the bushing, and into at least one fuel passage section 32 which is located between the spans 26, 28. The control chambers 30a, 30b are connected through control lines to a servo-valve (not shown) which gives the possibility of controlling a displacement of the drawer inside the bushing. Of course, other actuation modes of the drawer of the meter may be contemplated (for example electric actuation).

Moreover, the fuel passage section 32 of the metering unit opens upstream towards a fuel supply conduit (connected to the first branch 8a of the fuel supply circuit) and opens downstream towards a conduit of use (connected to the combustion injectors 14 of the engine). Of course, the fuel passage section of the metering unit may open upstream towards several independent conduits of use, as well as the metering unit may comprise several fuel passage sections opening towards different conduits of use.

More specifically, the fuel passage section 32 opens towards the conduit of use via a metering slot 34 said to be "with an increasing, for example exponential profile", i.e. a metering slot which has a narrow passage section 34a flaring according to a flare profile, for example of exponential shape, as far as a wider passage section 34b. This type of metering slot gives the possibility of ensuring the required metering accuracy for the operation of the engine over the whole of the flow rate range.

In the first embodiment of FIGS. 2A-2B and 3A-3B, the metering slot 34 is made in the bushing 24 and opens into the fuel passage section 32 of the meter via a lumen 36 made in the drawer and longitudinally delimited between a main edge 38 and a secondary edge 40.

The main edge 38 is here formed with an extension of one of the spans 28 of the drawer, while the secondary edge 40 is formed by a shoulder protruding in the passage section 32 of the fuel metering unit between both spans 26, 28 of the drawer. This secondary edge 40 is positioned so as to delimit with the main edge a lumen 36 which has a shorter length L1 than the length L2 of the metering slot 34 (the length of the metering slot being measured between its narrow passage section 34a and its wide passage section 34b). Thus, upon sliding the drawer inside the bushing, the lumen 36 moves facing the metering slot 34.

The bushing 24 also comprises a window 39 which opens upstream towards the fuel supply conduit and which opens into the fuel passage section 32, this window 39 being longitudinally shifted with respect to the metering slot 34.

The operation of such a fuel metering unit 12-1 is the following. In the position of low (or small) flow rate (FIGS. 2A-2B), the drawer 22 of the fuel metering unit slides (on a command from the servo-valve) inside the bushing 24 so that the metering slot 34 is for a great part obstructed by a wall portion of the drawer extending from the main edge 38 towards the span 28 of the drawer (i.e. only the narrow passage section 34a of the metering slot is exposed and allows the fuel to pass from the fuel passage section 32 to the conduit of use, the remainder of the metering slot being masked by said wall portion of the drawer).

In this low flow rate position, it will also be noted that the window 39 made in the bushing 24 and opening upstream towards the fuel supply conduit is partly obstructed by the shoulder forming the secondary edge 40 of the drawer of the meter.

When the servo-valve orders the fuel metering unit to position itself for a high flow rate (FIGS. 3A-3B), the drawer of the fuel meter slides inside the bushing 24 so that the metering slot 34 is for a great part exposed (i.e. only the narrow passage section 34a of the metering slot is masked by the shoulder forming the secondary edge 40 of the drawer, the remainder of the metering slot being exposed and allowing passing of the fuel from the fuel passage section 32 to the conduit of use).

More specifically, in this high flow rate position, the shoulder forming the secondary edge 40 of the drawer of the fuel metering unit will mask the narrow passage section 34a of the metering slot in order to avoid any passing of fuel through this portion of the metering slot.

The displacement of the drawer is preferably provided so that the main edge 38 of the lumen 36 made in the drawer never reaches the position of the end edge of a larger width of the metering slot 34, this end edge of the slot therefore remains masked by the main edge 38. In other words, in an end position of the drawer corresponding to the maximum flow rate, a small space is provided in the axial direction between the main edge 38 and this end edge of the metering slot 34. Indeed, it is important that the system for regulating the flow may control the maximum flow in the end position of the drawer, i.e. notably so that the regulation system may further increase to some extent this maximum flow rate by driving the drawer slightly beyond its end position. In other words, this end position of the drawer is not an end-of-travel abutment position of the drawer, since such an abutment position would imply loss of control by the flow rate regulation system. It may be considered that this extreme end position is a quasi end-of-travel position of the drawer.

Accordingly, any risk that ice particles from the icing of the fuel will agglomerate in the narrow passage section of the metering slot is set aside. In this way, when the fuel metering unit passes again from this high flow rate position to the low flow rate position of FIGS. 2A-2B where only the narrow passage section 34a of the metering slot is exposed, the passing of fuel through this passage section is not perturbed by the agglomeration of ice particles.

It will also be noted that in this high flow rate position, the window 39 made in the bushing 24 and opening upstream towards the fuel supply conduit is no longer obstructed by the shoulder forming the secondary edge 40 of the drawer of the metering unit.

It will further be noted that the shoulder forming the secondary edge 40' of the drawer of the fuel metering unit (which will mask the narrow passage section 34a of the metering slot in the high flow rate position) may be an added element or form a single and same part with the drawer 22 of the fuel metering unit.

FIGS. 4A-4B and 5A-5B schematically illustrate a fuel metering unit 12-2 according to a second embodiment of the first embodiment.

This second embodiment is distinguished from the first embodiment of the invention by the way how are laid out the fuel supply conduit and the conduit of use. Relatively to the embodiment described earlier where these conduits open into the metering unit on a same "side" of the bushing while being longitudinally shifted relatively to each other, these conduits are here longitudinally aligned with each other and open into the metering unit along two opposite sides, respectively an upstream side and a downstream side, of the latter.

In this configuration, the fuel passage section 32' is central and opens in the upstream direction into the fuel supply conduit and in the downstream direction into the conduit of use, these conduits being aligned with each other. For this purpose, the bushing 24 comprises a window 42 which opens upstream towards the fuel supply conduit and which is longitudinally aligned with the metering slot 34 (i.e. the orthogonal projections of the metering slot and of the window 42 on the longitudinal axis of the meter substantially coincide). The drawer 22 also comprises a lumen 39' which permanently opens into the passage section 32' regardless of the position of the drawer.

It will be noted that the perspective illustrations of the fuel metering unit 12-2 in FIGS. 4A and 5A only illustrate the downstream side of the metering unit, so that the lumen 39' of the drawer and the window 42 of the bushing located on the upstream side are not illustrated.

Still in this second embodiment, the metering slot 34 opens into the fuel passage section 32' of the metering unit via the lumen 36 made in the drawer 22 and longitudinally delimited between a main edge 38 and a secondary edge 40.

The main edge 38 is here formed by an edge of a wall of the drawer in the extension of one of the spans 28 of the drawer, while the secondary edge 40 is formed by the extension of the other span 26 of the drawer. The secondary edge 40 is also positioned so as to delimit with the main edge a lumen 36 which has a shorter length L1 than the length L2 of the metering slot 34.

The longitudinal alignment of the window 42 of the bushing with the metering slot 34 is not indispensable here. Indeed, it is possible for example to provide that the section of the fuel supply conduit has a size different from that of the conduit of use, along the longitudinal direction and/or the circumferential direction of the metering unit.

The operation of the fuel metering unit 12-2 according to this second embodiment is similar to the one described earlier.

In the low flow rate position (FIGS. 4A-4B), the drawer 22 of the fuel metering unit 12-2 slides inside the bushing 24 so that the metering slot 34 is for a large part obstructed by a wall portion of the drawer extending from the main edge 38 to the span 28 of the drawer (only the narrow passage section 34a of the metering slot is exposed, the remainder of the metering slot being masked by said wall portion of the drawer).

In the high flow rate position (FIGS. 5A-5B), the drawer 22 of the fuel metering unit slides so that the metering slot 34 is for a large part exposed (i.e. only the narrow passage section 34a of the metering slot is masked by a wall portion of the drawer extending from the secondary edge 40 to the span 26 of the drawer, the remainder of the metering slot being exposed and allowing passing of the fuel from the fuel passage section 32 to the conduit of use). Thus, in this high flow rate position, any risk that ice particles from the icing of the fuel will agglomerate in the narrow passage section 34a of the metering slot is set aside.

In connection with FIGS. 6, 7A-7B and 8A-8B, a fuel metering unit 12-3 according to a third embodiment of the invention will now be described.

This third embodiment is distinguished from the second embodiment in that the bushing 24 further comprises an orifice 44 opening into the fuel passage section 32' and opening towards the conduit of use. This orifice 44 typically allows adjustment of the regulation of the minimum flow rate of fuel delivered by the meter towards the conduit of use.

Figure 8B:
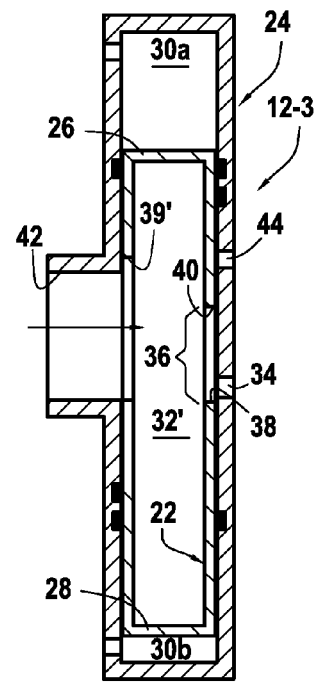
Figure 7A:
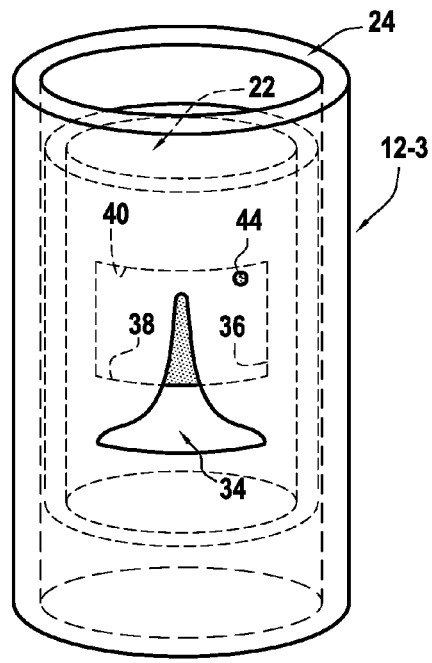
Figure 8A:
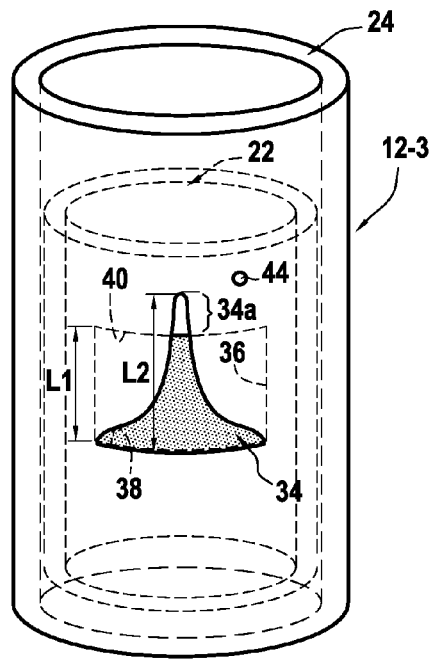

The orifice 44 is positioned on the bushing 24 so as to be exposed when the drawer is in the small flow rate position (FIG. 6) and with moderate flow rate (i.e. between the low and high flow rate—FIGS. 7A-7B), and obstructed by the secondary edge 40 of the lumen 36 of the drawer 22 when the drawer is in the high flow rate position (FIGS. 8A-8B).

Thus, in the high flow rate position, any risk that ice particles from the icing of the fuel will agglomerate in the narrow passage section 34a of the metering slot 34 and in the orifice 44 is set aside.

Moreover, in this exemplary embodiment, when the fuel metering unit passes from the low flow rate position to the high flow rate position, the orifice 44 becomes obstructed a little before the obstruction of the narrow passage section 34a of the metering slot by the secondary edge.

Figure 9A:
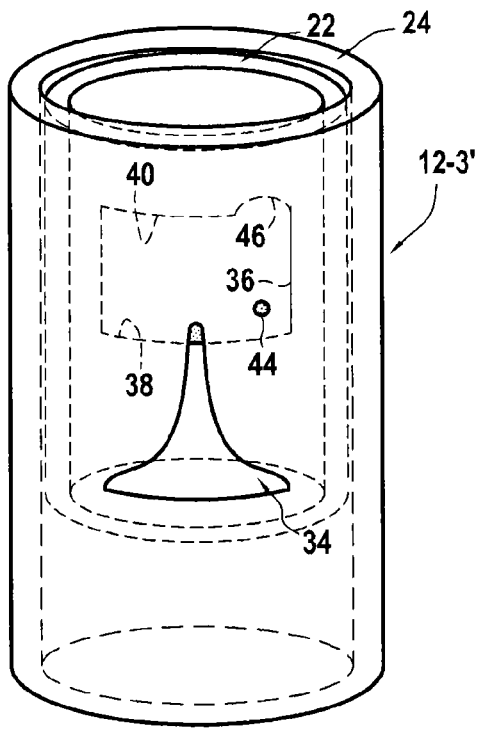
Figure 9B:
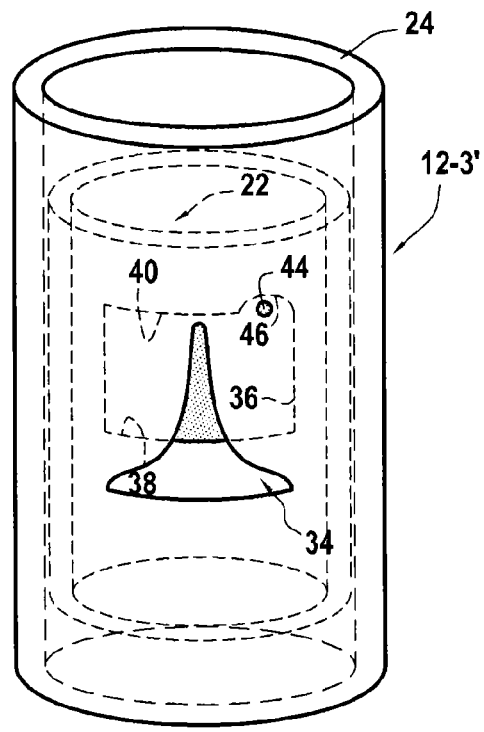
Figure 9C:
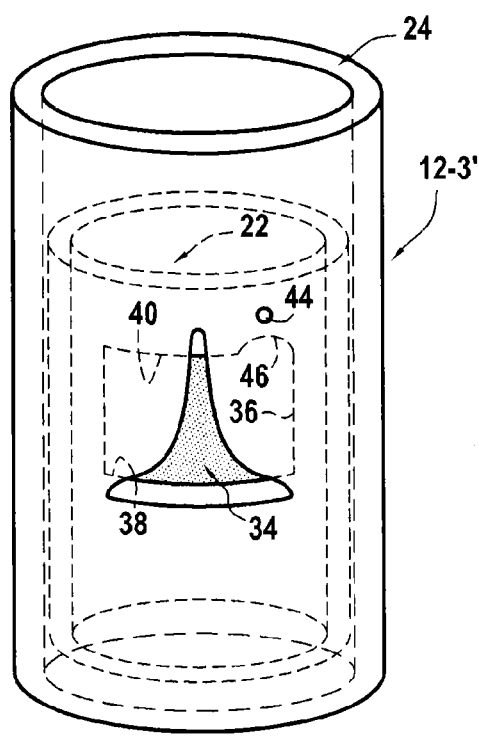
Figure 10A:
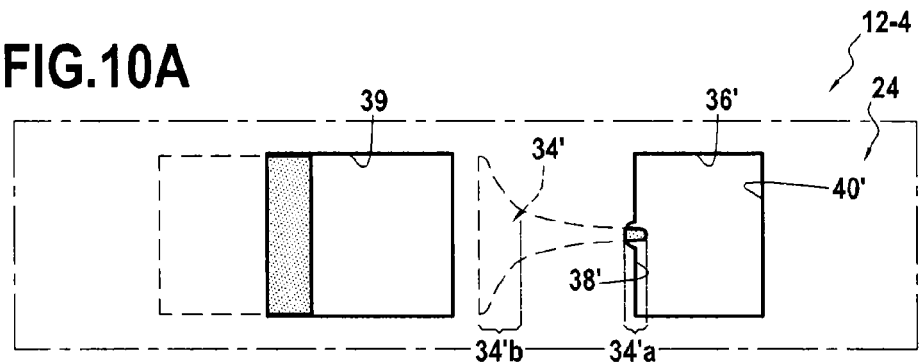
FIGS. 10A-10B and 11A-11B schematically illustrate a fuel metering unit according to a fourth embodiment of the invention in its low flow rate and high flow rate position, respectively.
Figure 10B:
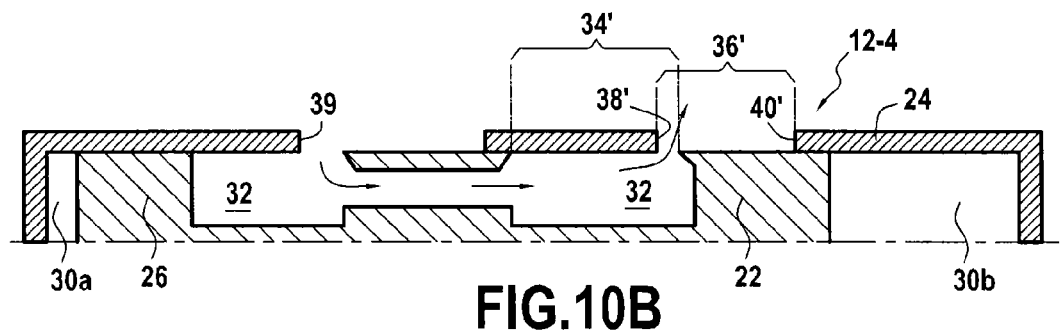
Figure 11A:
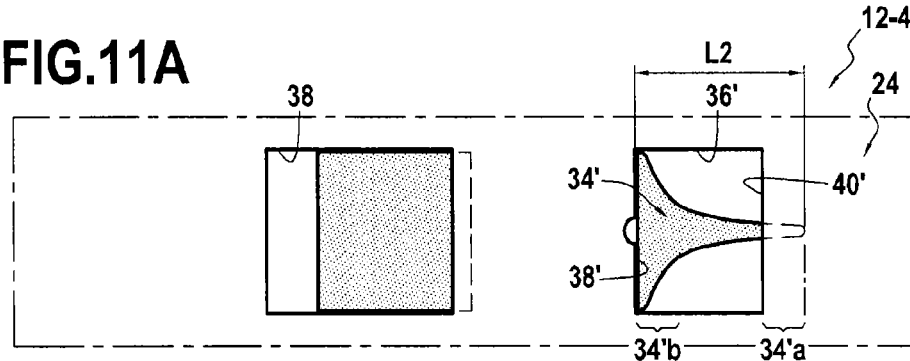
Figure 11B:
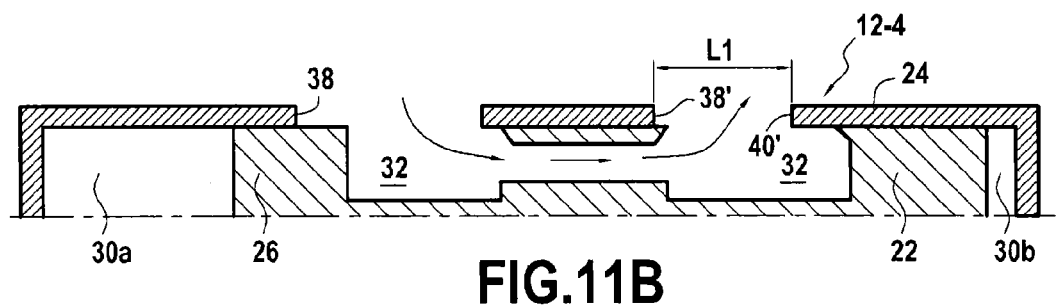

In an alternative embodiment of this third embodiment illustrated in FIGS. 9A to 9C, the secondary edge 40 of the lumen 36 of the drawer 22 of the metering unit 12-3' has a profiled profile 46 so as to allow obstruction of the orifice 44 as soon as the narrow passage section 34a of the metering slot 34 begins to be obstructed by the secondary edge.

Thus, FIG. 9A illustrates the metering unit 12-3' in a small flow rate position in which both the narrow passage section 34a of the metering slot 34 and the orifice 44 are exposed so as to allow adjustment of the minimum fuel flow rate towards the conduit of use. In the moderate flow rate position of FIG. 9B, the orifice 44 remains exposed while the metering slot is exposed. Finally, in order to reach the high flow rate position, the orifice 44 is obstructed by the secondary edge 40 as soon as the narrow passage section 34a of the metering slot 34 begins to be obstructed by said secondary edge (see FIG. 9C for example illustrating 80% of the high flow rate).

In an alternative (not shown in the Figures) of this third embodiment, the drawer of the fuel metering unit comprises an additional lumen (independent of the lumen 36 described earlier) through which the fuel passage section is able to open towards a conduit of use via the orifice for adjusting the minimum fuel flow rate. This additional lumen is able to be moved facing said orifice so as to be able to obstruct it when the drawer is in the high flow rate position.

In connection with FIGS. 10A-10B and 11A-11B, a fuel metering unit 12-4 according to a fourth embodiment of the invention will now be described.

The fuel metering unit 12-4 of this fourth embodiment of the invention is distinguished from those described earlier notably in that the metering slot 34' is made in the drawer 22 (and not in the bushing 24) facing the fuel passage section 32 and opens towards the conduit of use via a lumen 36' made in the bushing 24 (and not in the drawer) and longitudinally delimited between a main edge 38' and a secondary edge 40'.

The main edge 38' and the secondary edge 40' are here formed by edges of the bushing 24 longitudinally delimiting the lumen 36', the latter having a length L1 (between the edges 38', 40') which is shorter than the length L2 of the metering slot 34' (between its narrow passage section 34'a and its wide passage section 34'b). Thus, upon sliding the drawer 22 inside the bushing 24, the metering slot 24' moves facing the lumen 36'.

The bushing 24 also comprises a window 39 opening upstream towards the fuel supply conduit and opening into the fuel passage section 32, this window 39 being longitudinally shifted with respect to the lumen 36'.

The operation of the fuel metering unit 12-4 according to this fourth embodiment is the following. In the low flow rate position (FIGS. 10A-10B), the drawer 22 of the fuel metering unit slides inside the bushing 24 so that the metering slot 34' is for a large part obstructed by a wall portion of the bushing extending from the main edge 38' of the lumen 36' of the bushing towards the window 39 (only the narrow passage section 34'a of the metering slot is exposed and allows fuel to pass from the fuel passage section 32 to the conduit of use).

In the high flow rate position (FIGS. 11A-11B), the drawer of the fuel metering unit slides inside the bushing 24 so that the metering slot 34' is for a large part exposed (only the narrow passage section 34'a of the metering slot is masked by the secondary edge 40' of the lumen 36' of the bushing, the remainder of the metering slot being exposed and allows the fuel to pass from the fuel passage section 32 to the conduit of use).

In this high flow rate position, the edge of the lumen 36' of the bushing forming the secondary edge 40' will mask the narrow passage section 34'a of the metering slot in order to avoid any passing of fuel through this portion of the metering slot, and as well as no agglomeration therein of ice particles from the icing of the fuel. In this way, when the fuel metering unit 12-4 again passes from this great flow rate position to the low flow rate position of FIGS. 10A-10B where only the narrow passage section 34'a of the metering slot 34' is exposed, the passing of fuel through this passage section is not perturbed by any ice particle.

Regardless of the embodiment of the fuel metering unit according to the invention, it will be noted that the shape of the cut out of the metering slot 34, 34' is adapted so as to widely compensate at a great flow rate for its partial obturation by the secondary edge 40, 40' at the narrow passage section 34a, 34'a of the metering slot. An exponential-shaped profile for the metering slot is as such particularly adapted for this result, since at a great flow rate, a small displacement of the drawer towards the maximum flow rate position substantially increases the exposed section of the metering slot, the flow rate gained on the side of the wide passage section of the metering slot during this small displacement of the drawer being much more significant than the flow rate lost on the side of the narrow passage section.

It is understood that the application of the invention is not limited to the embodiment of a metering unit with a drawer and bushing as described in the foregoing. The invention also applies to most of the other known architectures of fuel metering units with variable geometrical aperture, i.e. using a window for passing of fuel and a metering lumen also called a slot, the window and the slot being displaceable relatively to each other so as to vary the section of the aperture defined by the superposition of both elements.

From among these other known architectures, mention may notably be made of metering units with rotary pipes, in which the fuel passage window is made in a cylinder which may be moved in rotation relatively to its axis, the metering lumen being made in a partly cylindrical fixed wall which is radially superposed to the rotary cylinder. Mention may also be made of metering units with a sliding or rotary plate, in which the fuel passage window is made in a movable plate in translation or in rotation, the metering lumen being made in a fixed plate also called a counter-plate which is superposed to the movable plate along an axial direction corresponding to the direction of flow of the fuel.

By providing that the fuel passage window has an either axial or circumferential length, depending on the architecture of the metering unit, substantially less than the length of the metering lumen (slot), it is possible to mask the narrow portion of the metering lumen while the largest portion of the section of the lumen is exposed by the window. This arrangement thus allows the narrow portion of the slot to be protected against formation of ice in the case of icing of the fuel while ensuring a high fuel flow rate.

The invention claimed is:

1. A fuel metering unit comprising:
a movable element including at least a fuel passage section opening upstream towards a fuel supply conduit and opening downstream towards a conduit of use through a metering slot with a flared profile having a narrow passage section flaring as far as a wide passage section, the movable element being able to be displaced with respect to a fixed element between a low flow rate position in which the metering slot is for a large part obstructed and a high flow rate position in which the metering slot is for a large part exposed, the metering slot being made in the fixed element or in the movable element and obstruction of the metering slot being obtained by covering the metering slot with a wall of the movable element or of the fixed element,
wherein the metering unit further includes a device configured to obstruct at least partly the narrow passage section of the metering slot when the metering unit is in the high flow rate position.

2. The fuel metering unit according to claim 1, wherein the metering slot is made in the fixed element and opens into the fuel passage section via a lumen made in the movable element and longitudinally delimited between a main edge and a secondary edge, said lumen having a shorter length than a length of the metering slot and being able to move facing the metering slot so as to at least partly obstruct the narrow passage section of the metering slot when the metering unit is in the high flow rate position.

3. The fuel metering unit according to claim 2, wherein the fixed element forms a bushing which comprises a window opening upstream towards the fuel supply conduit and opening into the fuel passage section, said window being longitudinally shifted with respect to the metering slot.

4. The fuel metering unit according to claim 3, wherein the movable element forms a drawer able to longitudinally slide in the bushing, and the secondary edge is formed by a shoulder protruding into the fuel passage section between two spans of the drawer.

5. The fuel metering unit according to claim 4, wherein the shoulder is an element added on the drawer.

6. The fuel metering unit according to claim 2, wherein the fixed element comprises a window opening upstream towards the fuel supply conduit and opening into the fuel passage section, said window being alternatively longitudinally aligned with the metering slot with reference to a longitudinal axis of the flow structure.

7. The fuel metering unit according to claim 2, wherein the fixed element further comprises an orifice opening into the fuel passage section and opening towards the conduit of use, said orifice being obstructed by the secondary edge of the lumen of the movable element when the movable element is in the high flow rate position and exposed when the movable element is in the low flow rate position.

8. The fuel metering unit according to claim 7, wherein the secondary edge of the movable element has a profiled profile so as to allow obstruction of the orifice as soon as the narrow passage section of the metering slot begins to be obstructed.

9. The fuel metering unit according to claim 1, wherein the metering slot is made in the movable element facing the fuel passage section and opens towards the conduit of use via a lumen made in the fixed element and longitudinally delimited between a main edge and a secondary edge, said lumen having a shorter length than a length of the metering slot and the metering slot being able to be moved facing the lumen so that at least one portion of the narrow passage section of the metering slot is obstructed when the metering unit is in the high flow rate position.

10. The fuel metering unit according to claim 9, wherein the fixed element comprises a window opening upstream towards the fuel supply conduit and opening into the fuel passage section, said window being longitudinally shifted with respect to the lumen.

11. The fuel metering unit according to claim 1, wherein the movable element includes at least two spans and said at least one fuel passage section is located between said spans.

12. A fuel supply circuit of an aircraft engine, including a low pressure pumping system connected to a high pressure pumping system, and a fuel metering unit according to claim 1 for which the fuel passage section opens in the downstream direction towards combustion chamber injectors of the engine.

* * * * *